June 30, 1953  E. A. STALKER  2,643,512
GAS TURBINE POWER PLANT WITH CONTROLLED RATE OF ROTATION
Filed April 30, 1948  4 Sheets-Sheet 1
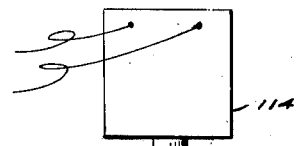
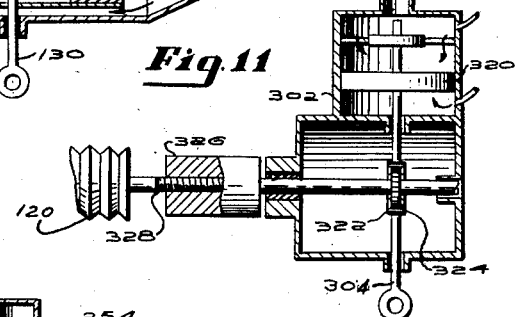
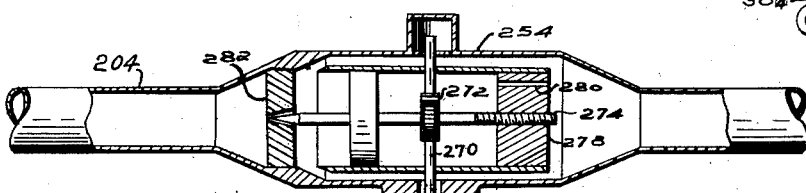
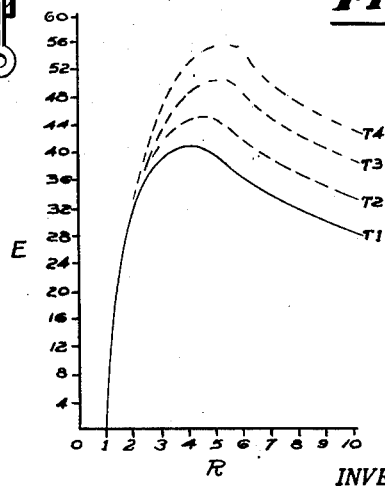
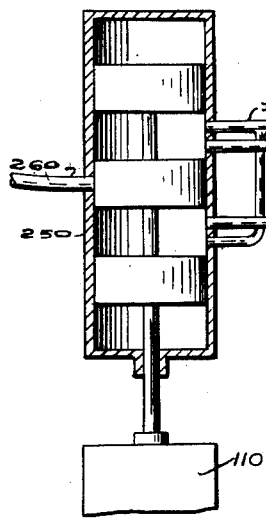
INVENTOR.
Edward A. Stalker

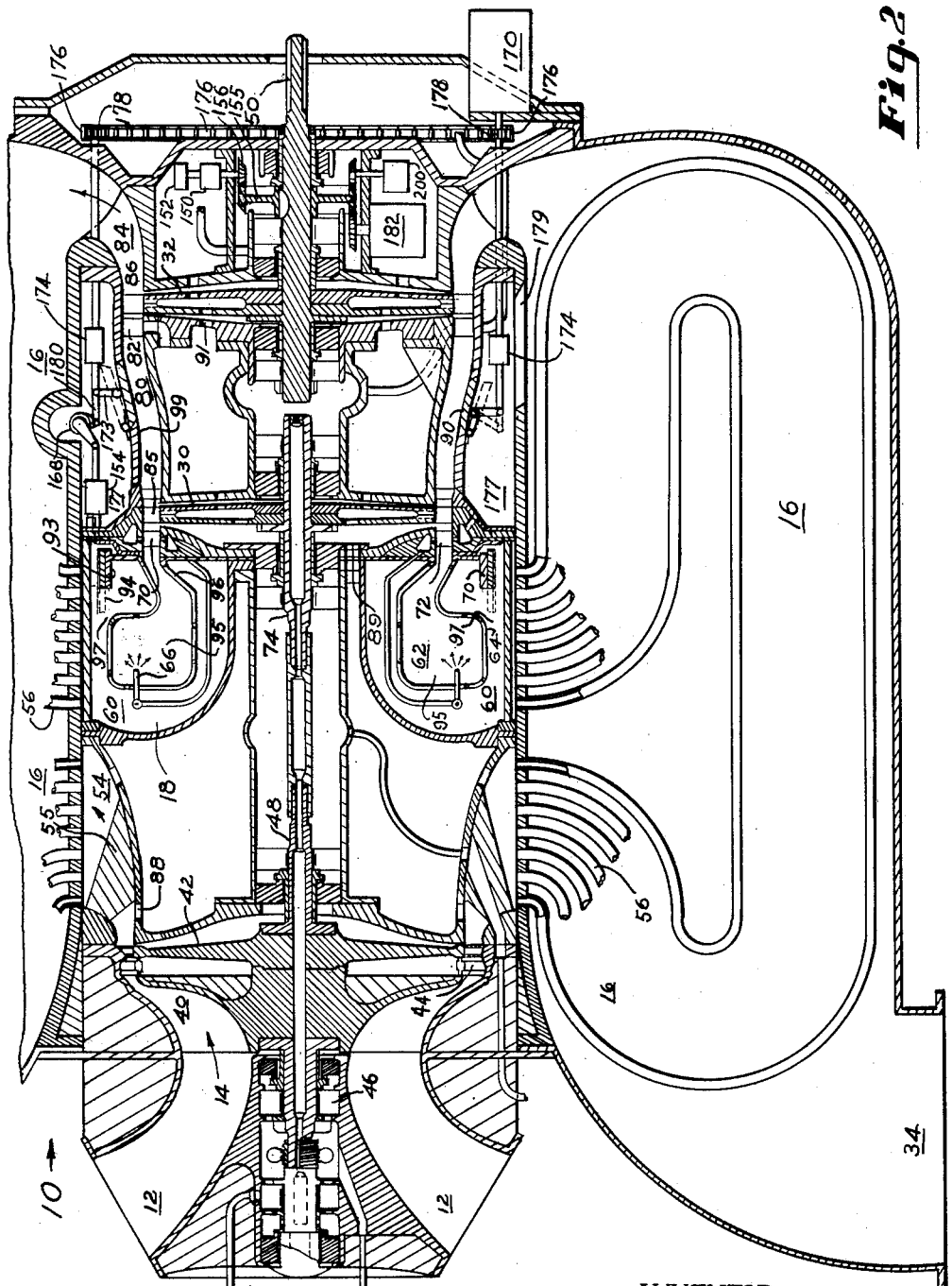

INVENTOR.
Edward A. Stalker

INVENTOR.
Edward A Stalker

Patented June 30, 1953

2,643,512

UNITED STATES PATENT OFFICE 2,643,512

GAS TURBINE POWER PLANT WITH CONTROLLED RATE OF ROTATION

Edward A. Stalker, Bay City, Mich.

Application April 30, 1948, Serial No. 24,234

11 Claims. (Cl. 60—39.16)

My invention relates to gas turbine powerplants and particularly to such a plant which can provide a prescribed rate of rotation under varying conditions. The condition may, for instance, be the maintenance of constant speed of rotation of a power output shaft.

An object of the invention is to provide a gas turbine powerplant which may be operated at substantially optimum fuel economy throughout a wide range of atmospheric density.

Another object of my invention is to provide a gas turbine power plant wherein control of the speed of the output shaft is accomplished by bleeding motive gas from the turbine into a regenerator.

Still another object is to control the speed of the output rotor by each or any in combination of the following devices, namely controlling the fuel supply in response to variation in altitude and/or variation in rate of rotation of a rotor, and controlling the dumping of motive gas into a regenerator.

Other objects will appear from the specification, claims and drawings.

I accomplish the above objects by the means illustrated in the accompanying drawings in which—

Figure 1 is set of curves, for various temperatures, each showing the typical variation of thermal efficiency with pressure ratio;

Figure 2 is an axial fragmentary section through the power plant;

Figure 6 is a sectional view of the metering device shown in association with the operating electric motor;

Figure 9 is an axial section through a control valve shown in association with the operating governor;

Figure 10 is a section through the hydraulically operated fuel metering device; and Figure 11 is an axial section through the control for superimposing a control displacement on the altitude control.

Figure 3:
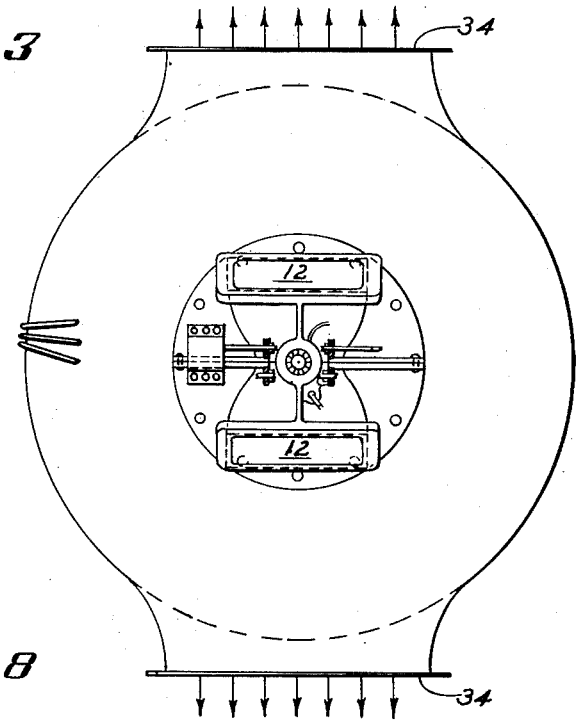
Figure 3 is a view of the inlet end of the power plant.

An aircraft power-plant, as for instance an auxiliary power-plant to operate a generator, may be called upon to deliver a fairly constant power at constant R. P. M. at all altitudes from sea level to perhaps 40,000 ft. A gas turbine is a machine of more or less constant volume flow. The air mass density at sea level is approximately four times as great as at 40,000 ft. altitude. Consequently if the temperature cycle adhered to at sea level is about the same as the temperature cycle at 40,000 ft., the power output of the machine would be about four times as great. To maintain only normal output conditions at sea level the combustion temperature must be sharply reduced compared to the combustion temperatures at 40,000 ft. This is in effect equivalent to fractional power operation (25%) and results in very low thermal efficiencies so commonly experienced in all gas turbines when they are operated in such a fractional power output regime.

In order to maintain constant speed of the output turbine or a certain speed pattern and at the same time keep the efficiency of the machine at the highest possible value, a number of properly coordinated controls are required.

The two main items to be controlled are the speed of the compressor and the opening of a by-pass valve. In order to simplify the control system, the speed of the compressor will be made to follow a certain pattern with changing altitude, this speed being as a first approximation an inverse function of the density. As the altitude is decreased the speed of the compressor decreases thereby reducing the volume flow. However, this reduction in volume flow is not sufficient to counteract the increase in density and an increase in power output would result if no further controls were exercised. To prevent this increase in power output the by-pass valve is opened to dump some of the hot gases directly into the regenerator.

Changes in power output required at a given altitude are taken care of by the by-pass and also by a corresponding change in fuel flow.

Another important feature in the control system is the mixture ratio control valve which is operated by the output turbine governor through a servo-motor. This valve regulates the amount of compressed air that enters the burner ahead of the flame front thereby controlling the fuel-air ratio before burning. The remainder of compressed air is allowed to enter the burner behind the flame front thus cooling the hot gases.

Figure 1 shows a plot of thermal efficiency E versus compression ratio R for a gas turbine having a regenerator. The curves are for different turbine inlet gas temperatures $T_1$, $T_2$, $T_3$, and $T_4$. It is to be observed that as the temperature drops from $T_4$ to $T_1$, the compression ratio for maximum thermal efficiency declines. The compressor of this invention is adapted to operate along a curve cutting the curves of Figure 1 near their peaks.

Thus at the design power output at the design altitude the compression ratio and gas temperature would be high. As lower altitudes are met both the temperature and the compression ratio are made to decline together so that the thermal efficiency is still a maximum.

It will now be clear that the reduction in compressor R. P. M. in order to reduce the air mass flow and keep the turbine power output constant with increasing air density can be carried out so that for the prevailing situation the thermal efficiency is a maximum.

In Figures 2 and 3 the turbine power-plant is indicated generally as 10. Air enters through the annular inlet 12 to the compressor 14 where it is compressed. The air is delivered into the heat exchanger 16, commonly called a regenerator, from whence it flows into the combustion assembly 18. It then flows through the compressor driving rotor 30 and the output rotor 32 in succession into the heat exchanger from which it is exhausted through the exit 34.

The compressor is comprised of the two compressor rotors 40 and 42 and the stator 44. These rotors are fixed on suitable shafts 46 and 48 for rotation about the shaft axis.

The first compressor rotor is a mixed flow one compressing the air chiefly by centrifugal force and discharging the air axially through between the stator blades of stator 44. These blades direct the air onto the blades of the rotor 42.

The output rotor is fixed to shaft 50 which is mounted for rotation independent of rotor 30.

The air is discharged from the compressor into annular duct 54 past strut 55 and thence into the exchanger tubes 56 which discharge the air into the collecting vessel or chamber 60 in which is positioned the combustion or heating chamber 62. The air enters the chamber through slots 64 in its surface. See Fig. 8. Within the combustion chamber, the fuel fed in through nozzles 66 is burned to produce a hot gas to supply power to the turbine rotors.

The hot air or gases pass through the passage 70 between the guide vanes 72 onto the blades of turbine rotor 30 fixed to shaft 74 which is fixed to shaft 48 of the compressor.

From the turbine rotor the motive gas flows through the annular duct 80, through the guide vanes 82 onto the blades of rotor 32, thence into passage 84 and the heat exchanger 16 where it circulates about the tubes 56 to heat the flow of air in them.

Figure 4:
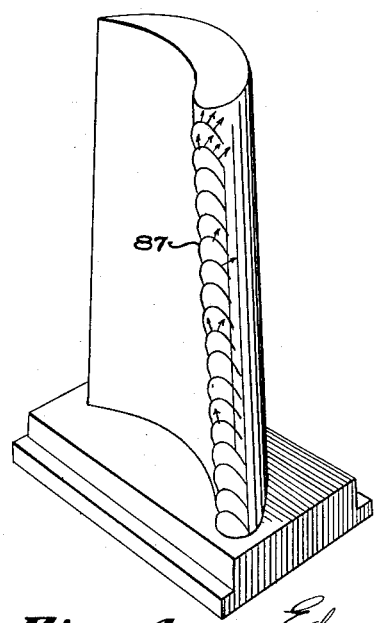
Figure 4 is a perspective view of a turbine blade showing the slots for emitting a cooling flow.

As shown in Figs. 2 and 4 the turbine blades 85 are 86 are cooled by air discharged from the blade slots 87 fed through the interior of the blades from the collection chamber via holes 88, 89 and 91.

The general control of the turbine speeds is exercised through the control of the quantity of fuel injected into the combustion chamber. The output rotor also called the rear rotor is also controlled by means of the dump valve 90 which can dump motive gas into the heat exchanger and reduce the quantity flowing through the rear turbine rotor. The valves 90 have a short peripheral extent and they are spaced peripheral about the case 99.

There is also a cylindrical valve 94 which is slideable axially to vary the proportion of air entering combustion end 95 of the combustion chamber and the rear end or mixing end 96 of the chamber. It will be clear that moving the cylinder axially on the cylinder 93 fixed to the turbine case constricts the annular opening 97 between the end of the cylinder valve and the combustion chamber 62.

The various controls must be operated in coordination to take care of the change in altitude and the varying power output load of the output turbine. These vary the amount of fuel being metered to the combustion chamber which tends to change improperly the fuel air ratio therein. The fuel air ratio is brought back or maintained at the proper value by controlling the cylindrical valve to control differentially the amount of air going to the combustion end and the mixing end of the chamber. Also to keep the rotation speed of the output turbine constant or at a desired speed the dump valve must be used.

These controls and devices for coordinating them will now be discussed.

Figure 5:
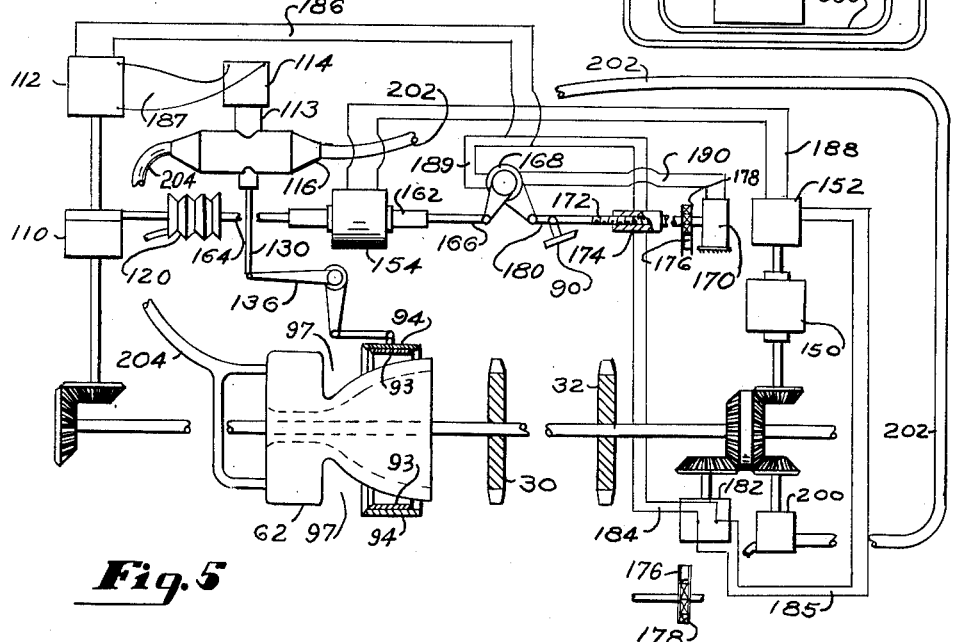
Figure 5 is a schematic layout of the electric control system for the power plant.

The forward rotor 30 has a governor 110 (see Fig. 5) geared to it to control the rate of rotation through varying the fuel rate to the combustion chamber 62. The governor operates the reversing switch 112 which controls the motor 114 running it forward or in reverse to vary the orifice opening of the fuel metering device 116. If the rotor 30 overspeeds the governor reduces the fuel quantity going to the combustion chamber and vice versa.

The balance speed of the governor is varied by changing the spring tension in the governor by means of the Sylphon 120 which expands with decreasing atmospheric pressure making the control a function of altitude.

The shaft 113 of motor 114 is internally threaded (see Fig. 6) and engages the external threads of rod 130 so that rotation of the rotor pushes the rod up or down. By means of the rack 115 cut on the external surface of 130 the needle 132 of the valves rotates in its threaded seat so that it is moved lengthwise to open or close the fuel orifice 133 by varying amounts.

The lower end of rod 130 is engaged to the bell-crank 136 to move the cylinder valve 94 axially.

The governor 150 operably connected to the rear rotor 32 operates reversing switch 152 controlling motor 154. This motor shifts the Sylphon 120 axially and thereby superimposes an additional variation on the balance spring of governor 110. By this arrangement the fuel metering device 116 is controlled by governor 110, by the Sylphon 120 responsive to altitude, and by governor 150 responsive to the rear rotor through the agency of gear train 155—156.

The motor 154 has a shaft 162 projecting from each end of the case. Each shaft is threaded internally to receive respectively, the threaded rod 164 connecting to the Sylphon and the threaded rod 166 extending to one arm of the follow up switch 168.

The follow up switch controls the motor 170 operating the dump valve 90. Each dump valve is actuated by the movement of an externally threaded rod 172 running in the internally threaded shaft 174 which is rotated by a chain belt 176 running over sprockets 178. One of these shafts is that of the motor 170. It carries one of the sprockets acting as a driving sprocket, and the chain 176 which runs over it drives the other three sprockets and shafts 174.

The rod 172 is pivoted to the valve arm 173 which is hinged to the valve 90. The latter is hinged at 175 to the case 99. When the shaft 174 is turned the rod 172 is moved axially to open its respective dump valve 90. When the valves 90 are open as shown dotted in Fig. 2 the gas escapes into annular compartment 177 and through opening 179 into the regenerator 16.

The rod 180 extends from the dump valve to the follow up switch 168 to cut off the current when the valve reaches its proper position.

The electric current for operating the various motors is supplied by the generator 182 driven from the shaft of the power output rotor. This current is delivered through the wire circuits 184 to 190.

The fuel is pumped by the fuel pump 200 delivering through the tube 202 to the metering device 116 and to the combustion chamber through tube 204.

It is important that the generator and fuel pump be driven from the power output shaft 50 when this shaft has a constant rate of rotation.

Figure 8:
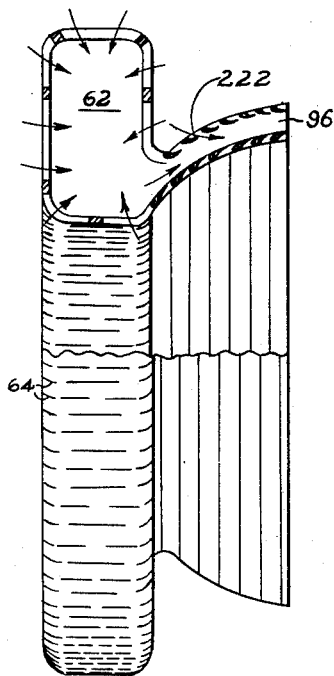
Figure 8 is a side elevation partly in section of the combustion chamber.

Fig. 8 shows a section through the combustion chamber. The air which enters at the combustion end does so through longitudinal slots 64. This air flows in a peripheral direction along the surface and interposes an insulating layer between the combustion gases which are produced in a zone disposed inward from the surface.

At the rear or mixing end 96 the insulating air enters through transverse slots 222 and the slot flow is in the longitudinal direction. The purpose of this air is to mix with the combustion gases from the front end and bring the gas temperature down to the proper value for entry into the first turbine rotor.

It is important that the two governors be connected to the means for heating the motive air so that the governors do not act in opposition. For instance if the front rotor tends to overspeed the front governor will try to reduce the fuel flow, but at the same time the rear rotor might be loaded additionally and tend to slow down. Its governor would then try to increase the fuel flow and the two governors would be working in opposition.

This condition is excluded by the control arrangement which arranges that the rear governor changes the balance speed of the front governor so that it attains a stable condition at a new or different rate of rotation.

Figure 7:
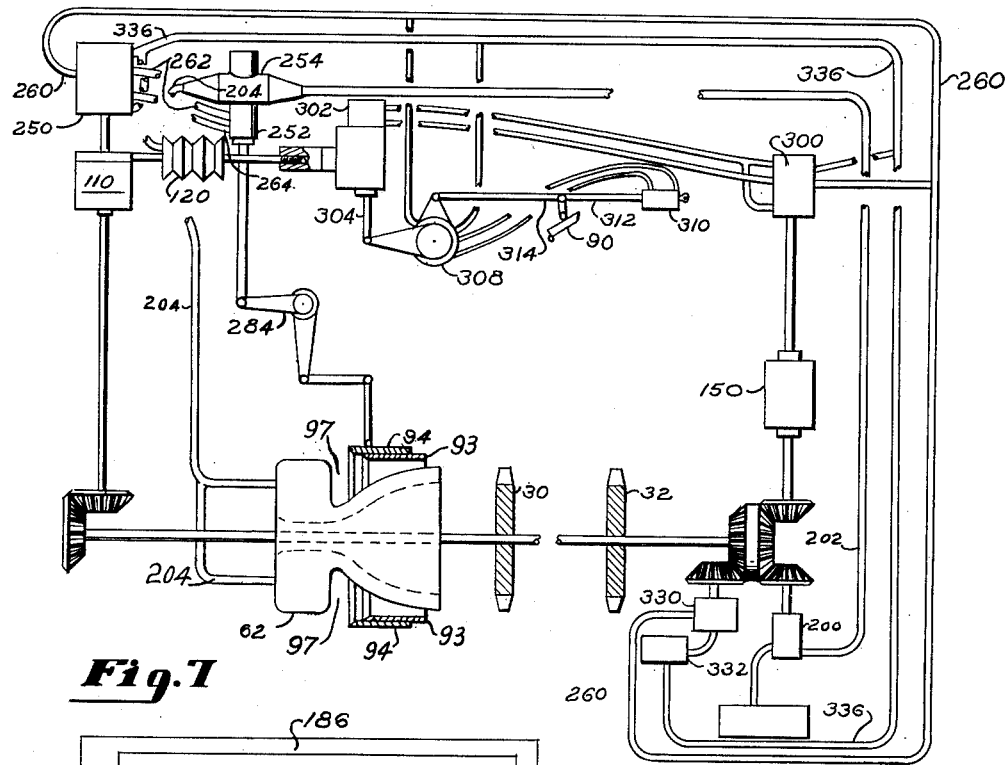
Figure 7 is a schematic layout of a hydraulic control system for the power plant.

The control system can also be hydraulic as shown schematically in Fig. 7. The governor 110 controls the valve 250 which delivers fluid pressure to the hydraulic cylinder 252 of the metering nozzle 254 to meter the fuel going to the combustion chamber.

The valve 250 is shown in section in Fig. 9. Hydraulic fluid under pressure enters through tube 260 and flows either to or from the cylinder 252 via tubes 262 and 264.

The metering nozzle is shown in section in Fig. 10. When fluid is directed into cylinder 252 via tube 262 it forces the piston 266 down. The piston rod 270 has a rack 272 formed on it which engages a pinion on the needle 274. Rotation of the needle moves it longitudinally by means of the threads 278 running in the internally threaded part 280. The tapered end of the needle meters the fuel flowing through the orifice 282.

The piston rod 270 extends out of the cylinder 252 to engage the arm of the bell crank 284 whose other arm is connected to the cylinder valve 94 to control the air flow to the combustion chamber.

The Sylphon 120 controls the balance spring of the governor 110 in response to atmospheric pressure as previously described.

The governor 150 controls the valve 300 which operates the jack 302 and superimposes an additional movement on the balance spring by shifting the Sylphon. This jack has a shaft 304 which moves longitudinally to actuate the follow up valve 308 which controls the jack 310 connected to the dump valve 90. The piston rod 312 is connected to the dump valve and a link 314 connects the dump valve to the follow up valve to shut off the flow of fluid to the jack when the dump valve has reached the proper position.

Fig. 11 shows the jack 302 in cross section. When the piston 320 is moved by hydraulic pressure the rack 322 of piston rod 308 rotates the pinion 324 fixed to the shaft 326 and this rotation moves the Sylphon by means of the threaded shaft 328 threaded into shaft 326.

The piston rod 304 extends outside the jack case to engage the arm of valve 308.

The follow up valve 308 has its arms positioned so that hydraulic fluid is not directed to the jack 310 until the piston rod 308 has moved some distance upward. A movement upward reduces the quantity of fuel being delivered to the combustion chamber and the dump valve is not opened until the speed of the output rotor has first been reduced by cutting the fuel flow.

Hydraulic fluid is supplied under pressure from the pump 330 drawing fluid from the tank 332 and delivering it through the tube 260. Fluid returns to the tank through tube 336.

It will be observed from the arrangement of the controls that the governor of the first rotor and the dump valve are connected in parallel to the governor of the output rotor.

It will also be observed that there is control means connecting the front governor and the altitude device in series to the fuel metering devices and that this control means and the dump valve are connected in parallel to the output governor.

The front governor and the altitude device are said to be connected in series because one of these can superimpose a change on the change caused by the other.

The fuel metering device and the dump valve are in parallel connection to the rear governor because changes in either can exist side by side without one going through the other.

The term regenerator or heat exchanger is used herein to mean one operating with the heating fluid flow out of contact with the fluid to be heated.

The air after fuel has been burned in it may be referred to as air or gas or the products of combustion.

For convenience the term turbine is sometimes used to include the heating or combustion means.

While I have illustrated a specific form of this invention it is to be understood that I do not intend to limit myself to this exact form but intend to claim my invention broadly as indicated by the appended claims.

I claim:

1. In combination in a gas turbine power-plant, a compressor, a gas turbine having a compressor driving rotor and an independent power output rotor, means operably connecting said compressor to said driving rotor, a regenerator, said compressor regenerator and turbine being connected in succession for the delivery of compressed air through said regenerator to said turbine, means to heat said air en route to said turbine from said regenerator, said heated air flowing through said rotors in succession, a governor operably connected to said heating means and responsive to a change in the rate of rotation of said compressor driving rotor to vary the heat output of said heating means to assign a selected rate of rotation to said compressor driving rotor, a pressure device responsive to change in atmospheric pressure, joining means operably connecting said device to said governor to set the governor for a balance rate of rotation according to atmospheric pressure, an output governor operably connected to said independent output rotor, controllable means to emit some of said heated air out of said turbine aft of said compressor driving rotor and ahead of said independent rotor into said regenerator to vary the rate of rotation of said output rotor, said output governor being operably connected to said controllable means for the operation thereof, connecting means operably connecting said output governor to said joining means to superimpose a variation on said heating means in addition to the variation caused by the first said governor to change the rate of rotation of said compressor driving rotor and to control the rate of rotation of said output rotor.

2. In combination in a gas turbine power-plant, a compressor, a gas turbine having a compressor driving rotor and an independent power output rotor, means operably connecting said compressor to said driving rotor, a regenerator, said compressor regenerator and turbine being connected in succession for the delivery of compressed air through said regenerator to said turbine, means to heat said air en route to said turbine from said regenerator, said heated air flowing through said rotors in succession, a governor operably connected to said heating means and responsive to a change in the rate of rotation of said compressor driving rotor to vary the heat output of said heating means to assign a selected rate of rotation to said compressor driving rotor, a pressure device responsive to change in atmospheric pressure, joining means operably connecting said device to said governor to set the governor for a balance rate of rotation according to atmospheric pressure, an output governor operably connected to said independent output rotor, controllable means to emit some of said heated air out of said turbine aft of said compressor driving rotor and ahead of said independent rotor into said regenerator to vary the rate of rotation of said output rotor, said output governor being operably connected to said controllable means for the operation thereof, connecting means operably connecting said output governor to said pressure device to superimpose a variation on said governor and thereby on said heating means in addition to the variation due to the atmospheric pressure to control the rate of rotation of said output rotor.

3. In combination in a gas turbine power-plant, a compressor, a gas turbine having a compressor driving rotor and an independent power output rotor, means operably connecting said compressor to said driving rotor, a regenerator, said compressor regenerator and turbine being connected in succession for the delivery of compressed air through said regenerator to said turbine, means to heat said air en route to said turbine from said regenerator, said heated air flowing through said rotors in succession, a governor operably connected to said heating means and responsive to a change in the rate of rotation of said compressor driving rotor to vary the heat output of said heating means to assign a selected rate of rotation to said compressor driving rotor, a pressure device responsive to change in atmospheric pressure, joining means operably connecting said device to said governor to set the governor for a balance rate of rotation according to atmospheric pressure, an output governor operably connected to said independent output rotor, controllable means to emit some of said heated air out of said turbine aft of said compressor driving rotor and ahead of said independent rotor into said regenerator to vary the rate of rotation of said output rotor, said output governor being operably connected to said controllable means for the operation thereof, connecting means operably connecting said output governor to said joining means to superimpose a variation on said heating means in addition to the variation caused by the first said governor to change the rate of rotation of said compressor driving rotor and to control the rate of rotation of said output rotor, said connecting means and said joining means having an operable element in common.

4. In combination in a gas turbine power-plant, a compressor, a gas turbine having a compressor driving rotor and an independent power output rotor, said compressor being operably connected to said compressor driving rotor to be driven thereby, means connecting said compressor to said turbine to supply compressed air thereto, controllable heater means to vary the quantity of heat added to said air en route to said turbine, said turbine being adapted to direct said heated air through said rotors in succession, a governor for each said rotor operably connected thereto, each said governor being responsive to a change in the rate of rotation of its respective rotor, said governor for said compressor rotor having a device for setting the balance rate of rotation of said compressor governor, connecting means operably connecting said governor of said compressor driving rotor to said heater means to vary the temperature of said air, and other connecting means operably connecting said other rotor governor to said device of said compressor driving rotor governor to alter the balance speed of said compressor driving rotor governor in response to a change in the speed of said power output rotor.

5. In combination in a gas turbine power-plant, a compressor, a compressor driving turbine rotor connected to said compressor to drive it, an independent power output turbine rotor, a heating chamber to conduct compressed air from said compressor to the inlet of said turbine, heating means to add heat to said air within said chamber, said turbine being adapted to direct said air axially through said rotors in succession to rotate them, a governor operably connected to said compressor driving rotor to be responsive to change in its rate of rotation, and a second governor operably connected to said output rotor to be responsive to its rate of rotation, a pressure responsive device responding to the air pressure at the pressure inlet, means connecting the first said governor to said heating means to control the quantity of heat added to said air in said chamber, and means connecting said pressure device and said second governor in series to the first said governor to alter the action of the first said governor on said heating means.

6. In combination in a gas turbine power-plant, a compressor for compressing air, a compressor driving turbine rotor, an independent power output turbine rotor, means including a heating chamber to conduct air from said compressor to the inlet of said turbine, heating means to add heat to said air within said chamber, said turbine being adapted to direct said air through said rotors in succession to rotate them, a controllable valve to emit said air from said turbine at a locality downstream from said compressor driving rotor and upstream from said output rotor to reduce the quantity of air flow through said output rotor, a governor means operably connected to said compressor driving rotor and said heating means to control the quantity of heat added to said air en route to said inlet in response to a change in the rate of rotation of said compressor driving rotor, said governor means including a device for adjusting the balance speed thereof, an output governor means operably connected to said output rotor to be responsive to a change in the rate of rotation thereof, and means connecting said valve and the first said governor means in parallel to said output governor means to be acted upon in response to a change in the rate of rotation of said output rotor to control said valve and adjust the balance speed of the first said governor.

7. In combination in a gas turbine power-plant, a compressor for compressing air, a turbine having a compressor driving turbine rotor, an independent power output turbine rotor, means including a heating chamber to conduct air from said compressor to the inlet of said turbine, heating means to add heat to said air within said chamber, said turbine being adapted to direct said air through said rotors in succession to rotate them, a valve to emit said heated air as an exhaust from said turbine at a locality downstream from said compressor driving rotor and upstream from said output rotor to reduce the quantity of air flow through said output rotor, a governor means operably connected to said compressor driving rotor and said heating means to control the quantity of heat added to said air en route to said inlet in response to the rate of rotation of said compressor driving rotor, an output governor means operably connected to said output rotor to be responsive to a change in the rate of rotation thereof, and means connecting said valve and the first said governor means in parallel to said output governor means to be acted upon in sequence in response to a change in the rate of rotation of said output rotor, and a heat exchanger included in the first said means and adapted to receive thereinto said compressed air flowing to said heating chamber and said exhaust flowing through said valve to heat said compressed air en route from said compressor to said heating chamber.

8. In combination in a gas turbine power-plant, a compressor for compressing air, a gas turbine having a compressor driving turbine rotor and an independent power output turbine rotor, means including a heating chamber to conduct air from said compressor to the inlet of said turbine, heating means to add heat to said air within said chamber, said turbine being adapted to direct said air through said rotors in succession to rotate them, a valve to emit said air from said turbine at a locality downstream from said compressor driving rotor and upstream from said output rotor to reduce the quantity of air flow through said output rotor, a governor means operably connected to said compressor driving rotor and said heating means to control the quantity of heat added to said air en route to said inlet in response to the rate of rotation of said compressor driving rotor, a device responsive to a change in compressor air inlet pressure, an output governor means operably connected to said output rotor to respond to a change in rate of rotation thereof, control means connecting said first governor means and said altitude device being connected to each other in series forming a control unit connected to said heating means to control said heating means in response to the combined action of the first said governor means and said device, and means connecting said unit and said valve in parallel to said output governor means to be actuated in response to a change in rate of rotation of said output rotor.

9. In combination in a gas turbine power plant, a compressor, a gas turbine, means joining the inlet of said turbine to said compressor to convey a flow of compressed air from said compressor to said turbine, said turbine having an adjustable heater means comprised of a combustion chamber and a mixing air compartment both adapted to receive portions of said compressed air thereinto, a controllable unit comprising an adjustable fuel supply means to provide fuel for combustion in said combustion chamber and an adjustable air flow means operably connected to said fuel means and operated coincidentally therewith to control the quantity of said portion of air for said mixing air compartment in relation to the quantity of said portion of air for said combustion chamber to establish a suitable air to fuel ratio for combustion in said combustion chamber, a pressure sensitive device operably connected to a said means comprised in said unit to alter the action of said means therein, said device being responsive to a change in the air pressure at the inlet of said compressor, said heater means being adapted to recombine said portions after combustion to provide a flow of proper temperature for said turbine, and means operable in response to a change in the rate of rotation of said turbine operably connected to said controllable unit to control the amount of air for said mixing compartment.

10. In combination in a gas turbine power plant, a compressor for compressing air, a compressor driving turbine rotor, an independent power output turbine rotor, means including a heating chamber to conduct air from said compressor to the inlet of said turbine, said turbine being adapted to direct said air through said rotors in succession to rotate them, a valve to emit said air from said turbine at a locality downstream from said compressor driving rotor and upstream from said output rotor to reduce the quantity of air flow through said output rotor, a control means comprising both a governor means operably connected to said compressor driving rotor and a controllable heating means to add heat to said air in said chamber en route to said inlet, said heating means being controllable in response to the rate of rotation of said compressor driving rotor, an output governor means operably connected to said output rotor to be responsive to a change in the rate of rotation thereof, and means connecting said valve and said means of said control means in parallel to said output governor means adapting said valve and associated said means of said control means to be acted upon in series by said output governor means in response to a change in the rate of rotation of said output rotor associated with said output governor means to control the heat output of said heating means and thereby the speeds of said rotors.

11. In combination in a gas turbine power plant, a compressor for compressing air, a turbine means having a compressor driving turbine rotor and an independent power output turbine rotor, a regenerator, a heating chamber means including said regenerator and heating chamber in series to conduct air from said compressor to the inlet of said turbine means, heating means to add heat to said air within said chamber means, said turbine means being adapted to direct said air through said rotors to rotate them, a valve means to emit said heated air as an exhaust from said turbine means at a locality upstream from said output rotor to reduce the quantity of air flow through said output rotor, said valve means being adapted to pass said exhaust into said regenerator to heat said air going through said regenerator to said chamber means in out-of-contact heat exchange relation, a governor means operably connected to said compressor driving rotor and said heating means to control the quantity of heat added to said air in said chamber means en route to said inlet in response to a change in the rate of rotation of said compressor driving rotor, and output governor means operably connected to said output rotor to be responsive to a change in the rate of rotation thereof, and means connecting said valve means and the first said governor means in parallel to said output governor means to be acted upon in response to a change in the rate of rotation of said output rotor.

EDWARD A. STALKER.

References Cited in the file of this patent

UNITED STATES PATENTS

| Number | Name | Date |
|---|---|---|
| 1,702,264 | Lorenzen | Feb. 19, 1929 |
| 2,095,991 | Lysholm | Oct. 19, 1937 |
| 2,353,929 | Ray | July 18, 1944 |
| 2,371,889 | Hermitte | Mar. 20, 1945 |
| 2,372,686 | Sédille | Apr. 3, 1945 |
| 2,390,959 | Pfenninger | Dec. 11, 1945 |
| 2,415,110 | Pateras Pescara | Feb. 4, 1947 |

FOREIGN PATENTS

| Number | Country | Date |
|---|---|---|
| 539,069 | Great Britain | Aug. 27, 1941 |